No. 698,637. Patented Apr. 29, 1902.
T. DUNCAN.
ELECTRIC METER.
(Application filed Feb. 7, 1898.)
(No Model.) 3 Sheets—Sheet 1.

Witnesses
Samuel R. Bachtel
Adelaide Kearns

Thomas Duncan Inventor
By His Attorneys Chapin & Denny

No. 698,637.

T. DUNCAN.
ELECTRIC METER.
(Application filed Feb. 7, 1898.)

Patented Apr. 29, 1902.

(No Model.)

3 Sheets—Sheet 2.

Witnesses
Samuel R. Bachtel
Adelaide Kearns

Thomas Duncan, Inventor
By His Attorneys Chapin & Denny

No. 698,637. Patented Apr. 29, 1902.
T. DUNCAN.
ELECTRIC METER.
(Application filed Feb. 7, 1898.)

(No Model.) 3 Sheets—Sheet 3.

Witnesses
Samuel R Bachtel
Adelaide Kearns.

Thomas Duncan Inventor
By His Attorneys Chapin & Denny

UNITED STATES PATENT OFFICE.

THOMAS DUNCAN, OF FORT WAYNE, INDIANA, ASSIGNOR TO THE SIEMENS & HALSKE ELECTRIC COMPANY OF AMERICA, OF CHICAGO, ILLINOIS, A CORPORATION OF ILLINOIS.

ELECTRIC METER.

SPECIFICATION forming part of Letters Patent No. 698,637, dated April 29, 1902.

Application filed February 7, 1898. Serial No. 669,383. (No model.)

*To all whom it may concern:*

Be it known that I, THOMAS DUNCAN, a citizen of the United States, residing at Fort Wayne, in the county of Allen, in the State of Indiana, have invented certain new and useful Improvements in Electric Meters; and I do hereby declare that the following is a full, clear, and exact description of the invention, which will enable others skilled in the art to which it appertains to make and use the same, reference being had to the accompanying drawings, which form part of this specification.

My invention relates to improvements in integrating wattmeters for the measurement of alternating electric currents and belongs to that class known as "integrating motor-meters."

The object of my present invention is to provide an improved method of and means for accurately measuring the energy expended on both inductive and non-inductive loads in alternating-current systems of distribution.

Another object of my invention is to secure such an arrangement of the actuating parts that the magnetism representing the electromotive force will lag ninety degrees behind the impressed electromotive force.

My invention comprises a series field carrying the main current, a compound shunt-coil representing the electromotive force in volts, a revoluble armature of the closed-circuit type arranged in inductive relation to the alternating magnetic fields of said series and volt-coils and adapted to be actuated thereby, a transformer supplying currents to the compound volt-coil, and means for adjusting the self-induction of the coils composing the said volt-coil.

Similar reference-numerals indicate like parts throughout the several views of the drawings, which are diagrammatic views illustrating the relation of the actuating parts of the meter.

Figure 1:
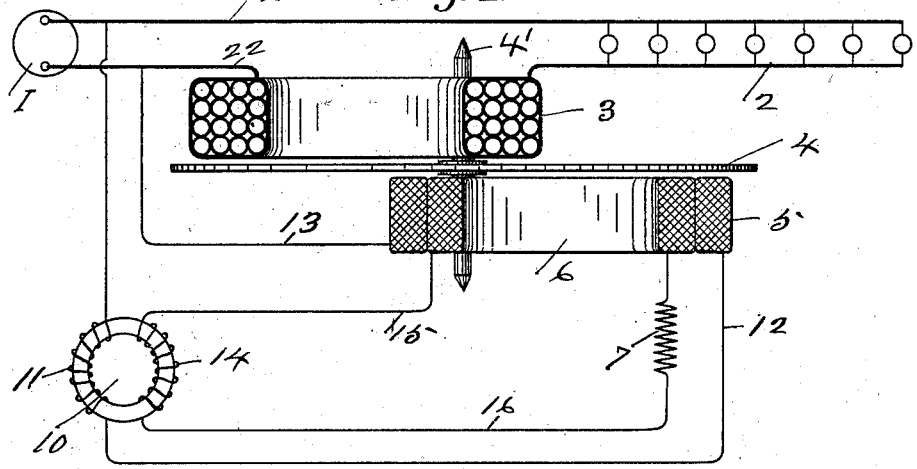
Figure 2:
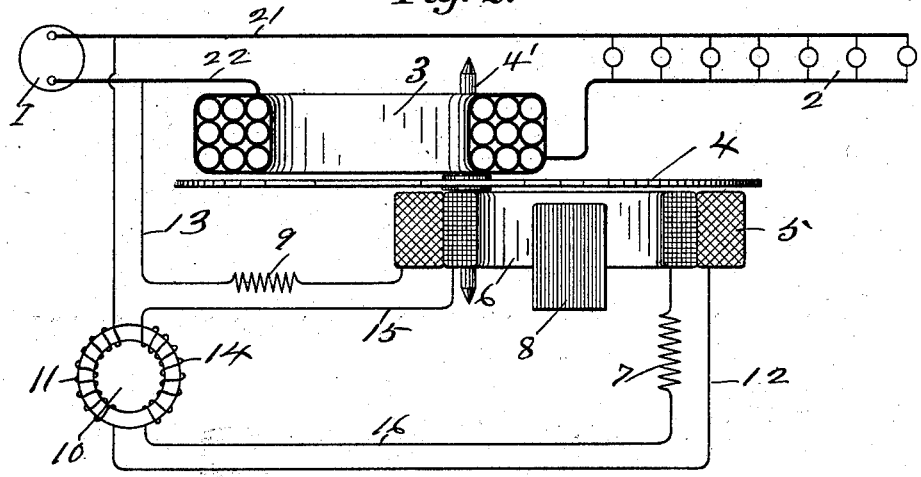
Figure 3:
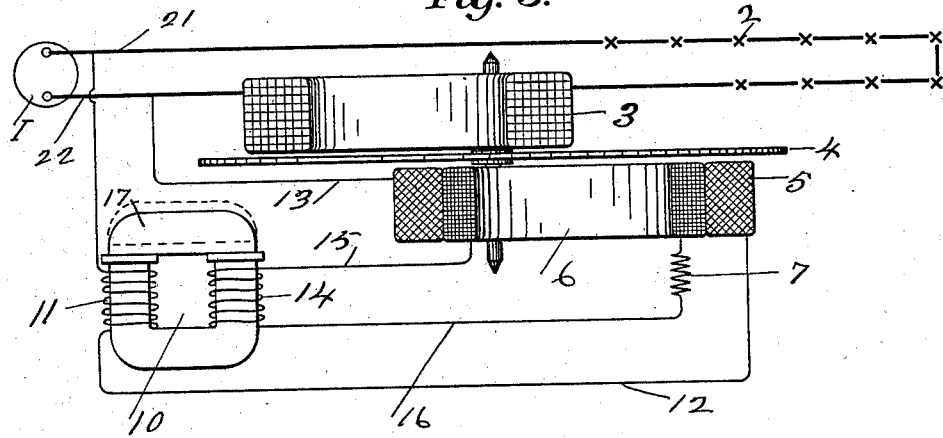
Figure 4:
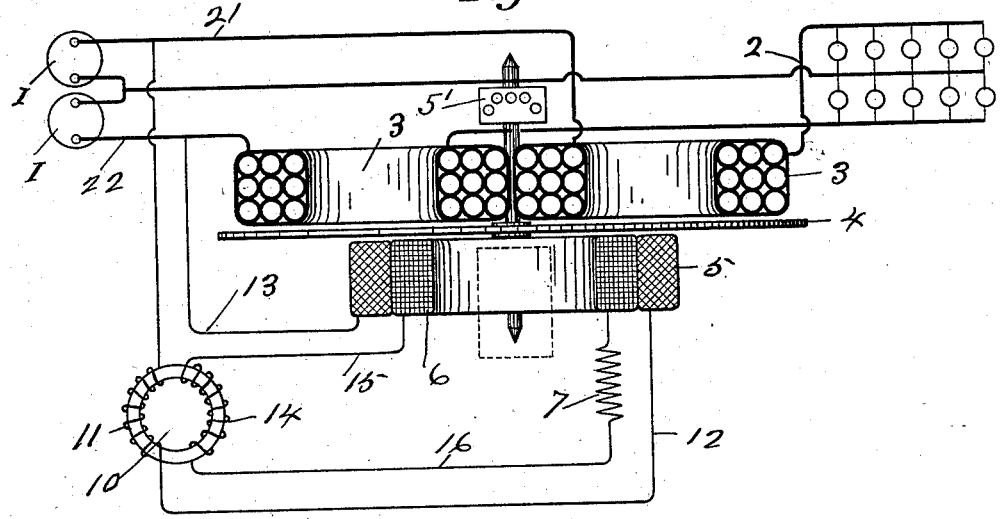
Figure 5:
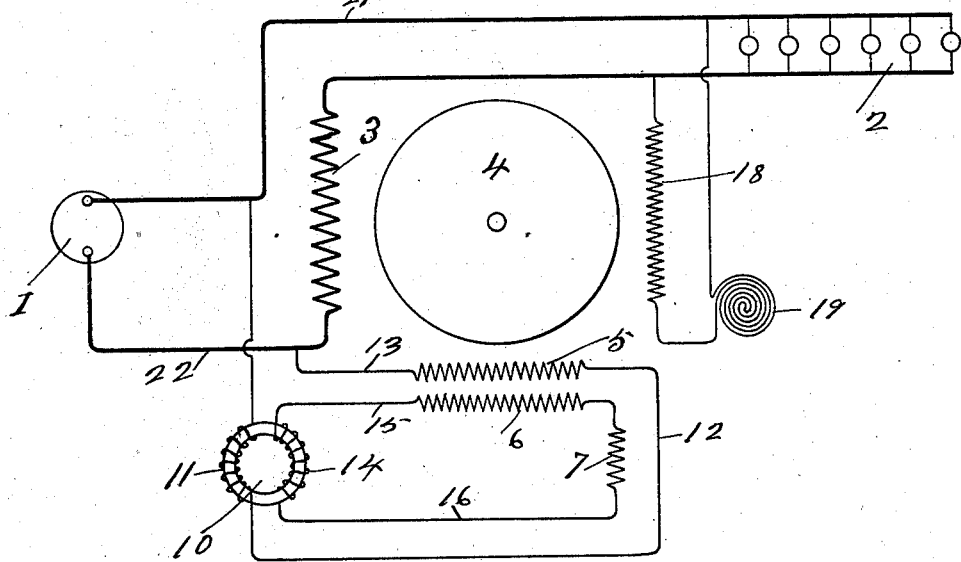
Figure 6:
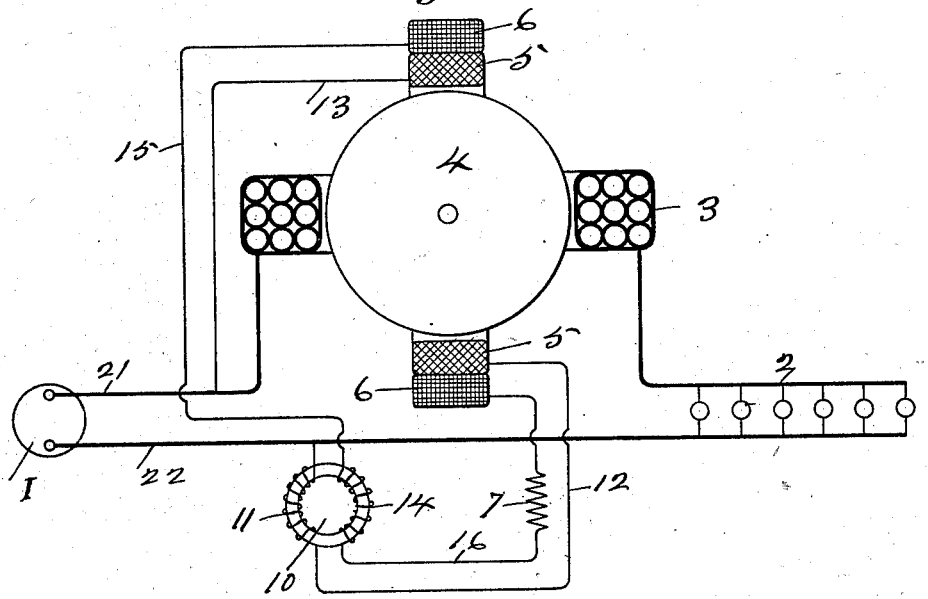

Figure 1 shows a disk-like armature in inductive relation to two alternating magnetic fields, consisting of a series coil and a compound volt-coil. Fig. 2 shows a resistance in series with one of the coils forming the compound volt-coil, which may be employed in conjunction with the resistance in the other coil of said volt-coil to adjust their resultant magnetism. Fig. 3 shows a form of transformer adapted to regulate the speed and accuracy of the meter by means of a separable adjustable part forming a part of the magnetic circuit. Fig. 4 shows the adaptation of my improvement to a three-wire system of distribution. Fig. 5 shows a modified arrangement of the series and volt coil and a starting-coil to overcome friction in series with a non-inductive resistance whereby its current will be in phase with the line electromotive force. Fig. 6 shows a cylindrical armature, as seen in Fig. 5, arranged within the series and volt coils.

Between the series coils 3 and the compound volt-coils 5 and 6 and in inductive relation thereto the armature 4 is revolubly mounted, being rigidly fixed to a proper shaft 4, adapted to rotate in suitable bearings. The armature 4 may be a thin disk of aluminium or other metal of proper conductivity, Figs. 1, 2, 3, and 4, or it may be in the form of a cylinder, as shown in Figs. 5 and 6. To the upper end of the armature-shaft 4 suitable counting or registering mechanism 5' is properly geared. At one side of said disk-like armature or closed conductor 4 or in close proximity thereto is arranged the series coil 3. Upon the opposite side of said armature is arranged the said compound shunt or volt coil the magnetism of which represents the electromotive force in volts and which is formed of two coils 5 and 6, the latter arranged within the former. These coils 5 and 6 have their magnetic axes concentric with each other and in parallel and eccentric relation with the axis of the series coil, and they receive their current from the transformer 10.

The operation of my improvement is as follows: The current from the generator 1 is transmitted to the translating devices or lamps 2 in the work-circuit over the lines 21 and 22 and passing through the series coil 3 in its path, thereby setting up in said coil a magnetic field proportional to the current strength. When the translating devices are incandescent lamps or other non-inductive transformers of energy, the current and magnetism of the series coils will be approximately in step with the electromotive force of the source of current. The rotation of the armature is produced by the resultant shifting field established by a difference of phase between the magnetism of the series coil and that of the compound shunt-coil, the said field acting inductively upon said armature in a well-understood manner.

The present practice of adding an inductive resistance in series with the volt-coil to give it the necessary lag behind the impressed electromotive force insures rotation of the armature proportional to the watts on non-inductive loads, but makes such meters unreliable and inaccurate on inductive loads, such as motors. To remedy this defect and make the torque of the meter proportional to the energy or watts on inductive loads, or $C^x E^x$ cosine of the angle of lag, the magnetism of the volt-coil must be in quadrature with the line electromotive force, and when the main current in the series coil is non-inductive it will be in phase with the line electromotive force, and both will be in advance of the magnetism of the said compound shunt-coil by ninety degrees, thereby accomplishing one of the principal objects of my invention. The coil 5 of said compound shunt-coil receives current from the supply-mains by being connected in series with the primary circuit 11 of the transformer 10 by means of the wires 12 and 13, and the coil 6 receives current from the secondary circuit 14 of the same transformer by means of the wires 15 and 16. The current flowing through the primary 11 and coil 5 will lag behind the line electromotive force less than ninety degrees, and the current flowing through the secondary 14 and the coil 6 will lag more than one hundred and eighty degrees, these currents flowing, respectively, through the coils 5 and 6 of the compound volt-coil, which are adjusted with the resistances 7 and 9, thus producing a resultant magnetic field which is ninety degrees behind the line electromotive force. This resultant magnetic field represents the pressure of the circuit, and since it lags ninety degrees behind the magnetism of the series coil when the latter is non-inductive a shifting field is established between the magnetism of the series coil and the resultant magnetism of the said coils 5 and 6, which thereby actuates the revoluble armature. The torque exerted with a given number of amperes and volts will depend upon the cosine of the angle of lag and will be proportional to the sine of the angle between the magnetism of the series or ampere coil and the resultant magnetism of the coils 5 and 6 with any given rate of alternations. If the resulting magnetism of the coils 5 and 6 of the said volt-coil is in quadrature with the line electromotive force, then by passing a current through the series coil that lags, say, forty-five degrees behind the line-pressure the torque exerted will only be .7071 of the apparent watts or proportional to the real watts. Should the current in the series coil lag ninety degrees behind the electromotive force no rotation of the armature will take place, for the obvious reason that the series and shunt fields would then be in phase with each other, and no shifting actuating-field will result. As a means for varying the self-induction of the coil 6 I employ a resistance 7. In Fig. 2 is shown another resistance 9 in series with the coil 5 and also a laminated iron core 8 in the compound volt-coil for adjusting the lag and rate of speed.

In Fig. 3 is shown a modified form of transformer having a separable piece 17, forming part of the magnetic circuit and adapted to be adjusted to any suitable distance to or from the poles of the U-shaped core of the coils 11 and 14. This figure also shows the series coil operating in a series circuit supplying the lamps 2.

In Fig. 5 the armature is of the cylindrical type, and the series and volt coils are shown diametrically at 3, 5, and 6. The resultant magnetism of 5 and 6 represents the pressure in volts. Fig. 5 also shows diametrically a shunt coil or winding 18 used to produce an initial starting torque for overcoming the friction. This coil 18 is in series with a non-inductive resistance 19, whereby its current will be in phase with the line electromotive force.

Having thus described my invention, what I desire to secure by Letters Patent is—

1. In an induction motor-meter, the combination with the series field-winding, of an armature in inductive relation therewith, a shunt field-winding also in inductive relation with said armature, said shunt field-winding comprising two coils and a transformer, the primary of said transformer being included in series with one of said pressure-coils and connected therewith across the circuit-mains, the secondary of said transformer being closed-circuited through the second pressure-coil, and a centrally-located core about which said pressure-coils are placed and affording the only path of magnetic material for the pressure lines of force to vary the magnetic flux due to said shunt-coil, threading the armature, an adjustment of said core toward the armature serving to deflect an increased number of lines of force through the armature, substantially as described.

2. In an induction motor-meter, the combination with a series field-winding, of an armature in inductive relation therewith, a shunt field-winding also in inductive relation with said armature, said shunt field-winding comprising two coils, a transformer, and means for varying the length of the magnetic circuit of said transformer, the primary of said transformer being included in series with one of said pressure-coils and connected therewith across the circuit-mains, the secondary of said transformer being closed-circuited through the second pressure-coil, and a centrally-located core about which said pressure-coils are placed, affording the only path of magnetic material for the pressure lines of force to vary the magnetic flux due to said shunt-coil, threading the armature, an adjustment of said core toward the armature serving to deflect an increased number of lines of force through said armature, substantially as described.

3. In an induction motor-meter, the combination with a series field-winding, of an armature in inductive relation therewith, a shunt field-winding also in inductive relation with said armature, said shunt field-winding comprising two coils, a transformer, and means for varying the length of said transformer, the primary of said transformer being included in series with one of said pressure-coils and connected therewith across the circuit-mains, the secondary of said transformer being closed-circuited through the second pressure-coil, a centrally-located core about which said pressure-coils are placed, affording the only path of magnetic material for the pressure lines of force, to vary the magnetic flux due to said shunt-coil threading the armature, an adjustment of said core toward the armature serving to deflect an increased number of lines of force through said armature, and adjusting resistances included in said primary and secondary transformer-circuits, substantially as described.

4. In an induction motor-meter, the combination with a series field-winding, of an armature in inductive relation therewith, a shunt field-winding also in inductive relation with said armature, said shunt field-winding comprising two coils, a transformer, and means for varying the length of said transformer, the primary of said transformer being included in series with one of said pressure-coils and connected therewith across the circuit-mains, the secondary of said transformer being closed-circuited through the second pressure-coil, a centrally-located core about which said pressure-coils are placed, affording the only path of magnetic material for the pressure lines of force to vary the magnetic flux due to said shunt-coil, threading the armature, an adjustment of said core toward the armature serving to deflect an increased number of lines of force through said armature, the said core being so proportioned that a large air-gap intervenes between the same and the said coils, and adjusting resistances included in said primary and secondary transformer-circuits, substantially as described.

Signed by me at Fort Wayne, Allen county, State of Indiana, this 31st day of January, A. D. 1898.

THOMAS DUNCAN.

Witnesses:
M. G. WEBBER,
CHAS. C. MILLER.